United States Patent [19]

Satoh

[11] Patent Number: 4,743,930
[45] Date of Patent: May 10, 1988

[54] RECEIVER OF CAMERA REMOTE CONTROL SYSTEM

[75] Inventor: Toshihiko Satoh, Tokyo, Japan

[73] Assignee: Canon Kabushiki Kaisha

[21] Appl. No.: 942,539

[22] Filed: Dec. 16, 1986

[30] Foreign Application Priority Data

Dec. 19, 1985 [JP] Japan .................................. 60-286161

[51] Int. Cl.$^4$ ............................................ G03B 17/40
[52] U.S. Cl. ................................................. 354/267.1
[58] Field of Search ..................... 354/131, 267.1, 266, 354/238.1

[56] References Cited

U.S. PATENT DOCUMENTS 3,961,342  6/1976  Maida .............................. 354/131 X

*Primary Examiner*—Michael L. Gellner
*Attorney, Agent, or Firm*—Toren, McGeady & Associates

[57] ABSTRACT

A camera remote control system including a transmitter arranged to transmit a control signal and a receiver arranged to receive said control signal to control an operation of the camera. The receiver of the camera remote control system is arranged to start a first stroke of operation of the camera when it has received the control signal transmitted by the transmitter and to start a second stroke of operation of the camera when a predetermined time has elapsed after starting the first stroke.

6 Claims, 3 Drawing Sheets

|  | | JF0 | | JF1 | |
|---|---|---|---|---|---|
|  | | J | K | J | K |
| 1. | in·CC0 | 1 | | | |
| 2. | =·T1·CC1 | | | 1 | |
| 3. | ≠·T2·CC1 | | 1 | | |
| 4. | T3·CC2 | | 1 | | |
| 5. | T1·CC3 | | | | 1 |

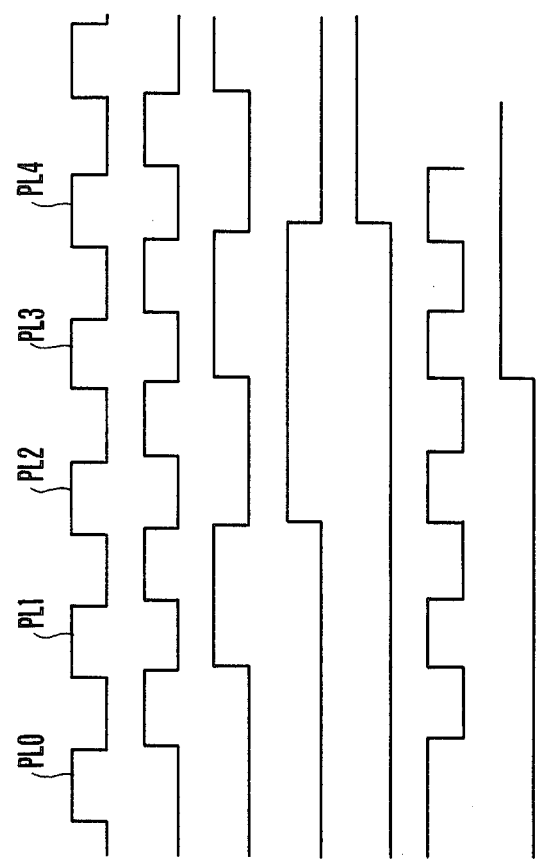

RECEIVER OF CAMERA REMOTE CONTROL SYSTEM

BACKGROUND OF THE INVENTION

1. Field of the Invention

The present invention relates to a camera remote control system including a transmitter arranged at a remote position to transmit a light signal, such as an infrared ray signal, and a receiver arranged at the camera to receive said light signal to control a photographing operation of the camera, and, more particularly, it relates to a receiver of the camera remote control system which is arranged to generate a camera releasing signal after receiving the light signal, thereby effecting the photographing operation of the camera.

2. Description of the Related Art

Recently, camera remote control system have become widely used, for example, with the object of making a study of ecology of animals, birds or the like. The camera remote control system, as mentioned above, includes a transmitter arranged at a remote position to transmit a light signal, such as an infrared ray signal, and a receiver arranged at a camera to receive the light signal to control the operation of the camera. The receiver generates a camera releasing signal after receiving the light signal and controls the photographing operation of the camera. According to the conventional construction of the camera remote control system, the receiver is arranged to start its camera releasing operation immediately after it has received the light signal from the transmitter and, consequently, there is no time to effect a preparatory operation (such as autofocussing operation in case of auto-focus photographing, charging operation in case of electronic-flash photographing or the like) before starting the camera releasing operation. That is disadvantageous in practical use of the camera remote control system.

SUMMARY OF THE INVENTION

It is an object of the present invention to solve the problem in the conventional camera remote control system.

An aspect of the present invention resides in providing a receiver for the camera remote control system of the above kind, which is arranged to firstly start a first stroke of operation of the camera when it has received the control signal transmitted by the transmitter and to start a second stroke of operation of the camera when a predetermined time has lapsed after starting the first stroke.

The other objects of the present invention will be understood from the descriptions of the preferred embodiment of the present invention which will be made with reference to the drawings.

BRIEF DESCRIPTION OF THE DRAWINGS

FIGS. 4(a)–4(g) are waveform diagrams for explaining about the operation of the circuit shown in FIG. 1.

DETAILED DESCRIPTION OF THE PREFERRED EMBODIMENT

Now the invention will be described in detail with reference to FIGS. 1–4.

Figure 1:
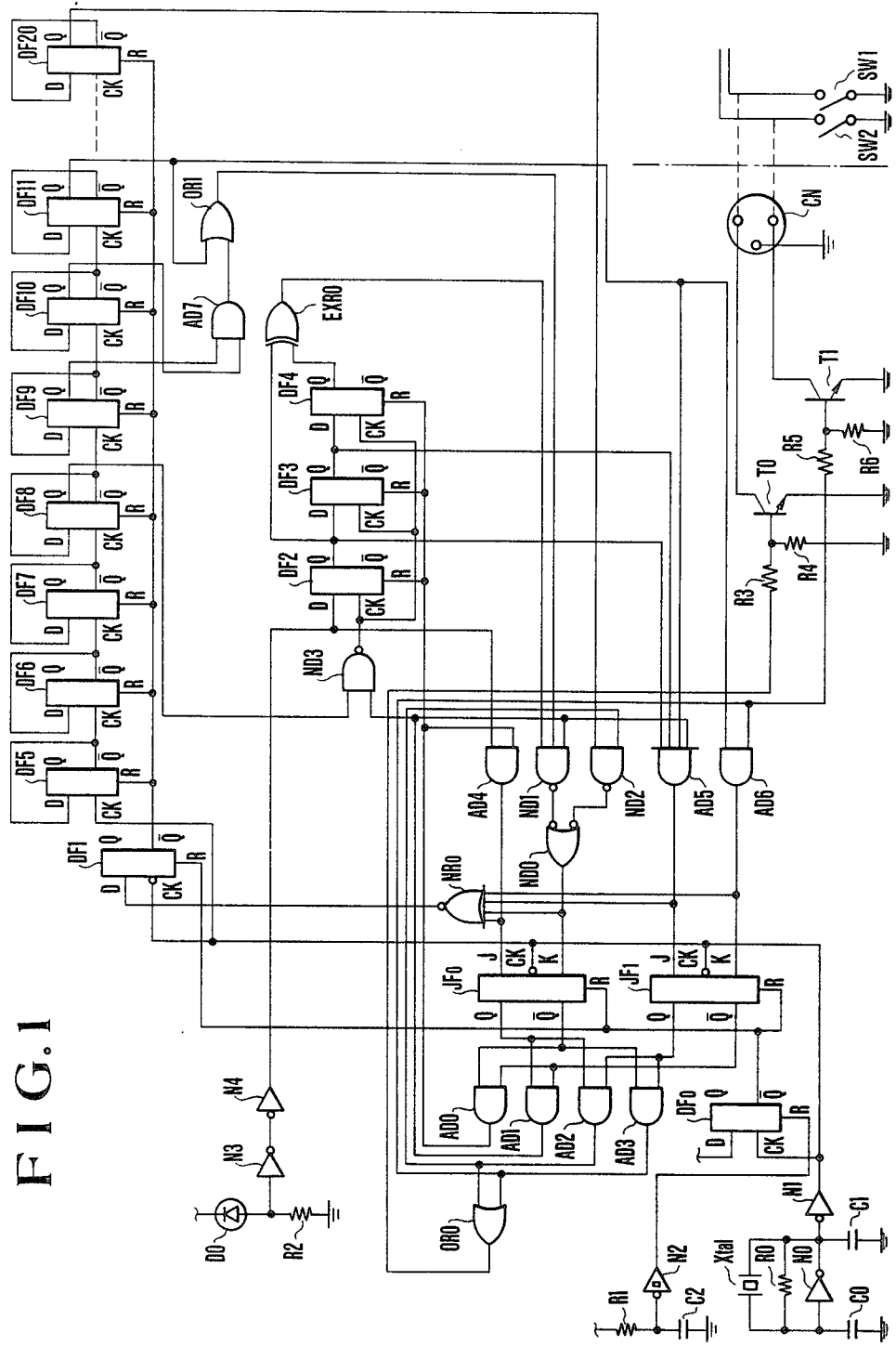
FIG. 1 is a circuit diagram illustrating an embodiment of the receiver of the camera remote control system according to the present invention.

Referring to the drawings, FIG. 1 is a circuit diagram showing an embodiment of the present invention. The circuit shown in FIG. 1 includes a light receiving diode D0 which receives a light signal transmitted from a transmitter (not shown), JK-type flip-flops JF0 and JF1, D-type flip-flops DF0–DF20, AND gates AD0–AD7, NAND gates ND0–ND3, OR gates OR0 and OR1, a NOR gate NR0, an EXCLUSIVE OR gate EXR0, inverters N0–N4 including a Schmidt-type inverter N2, an oscillator element Xtal, resistors R0–R6 and capacitors C0–C2.

Figures 2, 3:
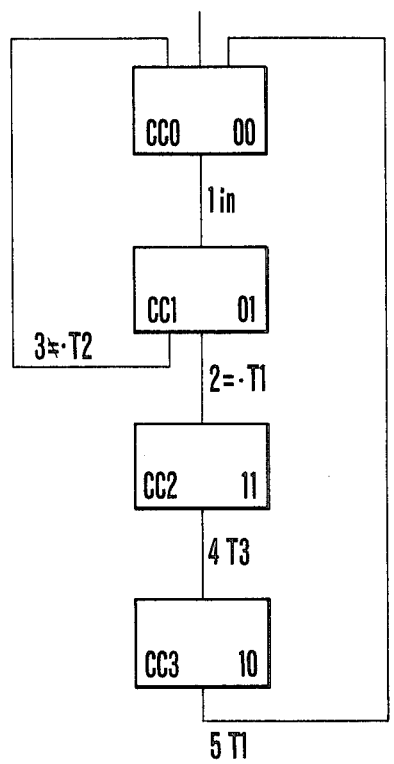
FIG. 2 is a flowchart indicating the operation of the circuit shown in FIG. 1.
FIG. 3 is a table showing states of flip-flops JF0 and JF1 shown in FIG. 1.

Now, the operation of the circuit will be described, with reference to FIG. 2 which is a flowchart indicating the operation of the circuit, FIG. 3 which is a table showing the states of the flip-flops JF0 and JF1, and FIGS. 4(a)–4(g) which are waveform diagrams showing waveforms of signals produced during operation.

When a main switch (not shown) is turned ON, electric power is fed to the circuit.

The inverters N0 and N1, the oscillator element Xtal, the resistor R0 and the capacitors C0 and C1 constitute an oscillating circuit, which starts its operation, and an oscillating frequency of this oscillating circuit is stabilized at a specific frequency as determined by the oscillator element Xtal.

On the other hand, the D-type flip-flop DF0, the inverter N2, the resistor R1 and the capacitor C2 constitute an initial-value setting circuit (hereinafter referred to as PUC), which also starts its operation, and a "1" signal is produced at $\overline{Q}$ output of the D-type flip-flop DF0 for a predetermined time as determined by a time constant of the resistor R1 and the capacitor C2. This output signal is fed to R-terminal of the JK-type flip-flop JF0, R-terminal of the JK-type flip-flop JF1, and R-terminal of the D-type flip-flop DF1, whereby the JK-type flip-flops JF0 and JF1 and the D-type flip-flop DF1 are reset. A "1" signal at Q output of the D-type flip-flop DF1 is fed to R-terminals of the D-type flip-flops DF5–DF20, whereby these D-type flip-flops DF5–DF20 are reset. In this state, both signals at $\overline{Q}$ outputs of the JK type flip-flops JF0 and JF1 are in "1" state, so that the AND gate AD0 produces a "1" output signal while the AND gates AD1–AD3 produce "0" output signals. The output signal of the AND gate AD0 is fed to R-terminals of the D-type flip-flops DF2–DF4, whereby these flip-flops DF2–DF4 are reset. Thus, after turning on the power source, the setting of initial values to the respective flip-flops is completed. This state is indicated by CC0 in FIG. 2.

Now, the description will be given to the case where the receiver held in the CC0 state receives the light pulse signal from a transmitter (not shown).

A control signal consisting of a series of light pulses transmitted by the transmitter is received by the light receiving diode D0. The signal received is converted into a voltage signal under the action of the resistor R2. The voltage signal is fed through the inverters N3 and N4 to one of the inputs of the AND gate AD4, and the output signal of and gate AD4 is fed to the J-terminal of the JK type flip-flop JF0, thereby setting said flip-flop. The output signal of the AND gate AD4 becomes "1", so that Q output signals of the JK-type flip-flops JF0 and JF1 become "1" and "0", respectively. Thus the AND gate AD4, produces a "1" output signal, while the AND gates AD0, AD2 and AD3 produce "0" output signals. This state corresponds to CC1 state indicated in the flowchart of FIG. 2. That is, the state shifts from CC0 to CC1.

Further, the "1" signal at the output of said AND gate AD4 is fed to the NOR gate NRo and a "0" signal is fed into the D-input of the D type flip-flop DF1, with the result that the $\overline{Q}$ output of the flip-flop DF1 becomes "1". Furthermore, since the state shifts from CC0 to CC1 as described above, the output signal of the AND gate AD1 becomes "0" as described above. Immediately after shifting, the output of the AND gate AD4 becomes "0" and the output of the NOR gate NRO returns to "1", so that the $\overline{Q}$ output of the flip-flop DF1 becomes "0" at once. Accordingly, the flip-flops DF5-DF20 are reset at the time of shifting to the CC1 state. These flip-flops DF5-DF20 constitute a binary counter. When these flip-flops have been reset after shifting to the above-mentioned CC1 state, the binary counter starts to count the pulses coming from the oscillating circuit.

On the other hand, the transmitter transmits the light signal including light pulses of predetermined period and the light receiving diode D0 of the receiver receives this light signal. Thus the received signal of the inverter N4 forms a waveform as indicated in FIG. 4(a).

Explaining more in detail, when the transmitter (not shown) is actuated, it starts to transmit a light signal including light pulses of a predetermined period. When the light receiving diode D0 receives a first light pulse signal, the state shifts from CC0 to CC1, as described above, and the counter, constituted by the flip-flops DF5-DF11, starts counting the pulses. This counter is so constructed that the period of the output pulse of the flip-flop DF8 coincides with that of the transmitted light signal, so that the output of the NAND gate ND3 is in synchronized relationship with the received signal, as indicated by a waveform shown in FIG. 4(f). This output is fed to clock terminals CK of the flip-flops DF2-DF4. These flip-flops DF2-DF4 constitute a shift register. The received signal is fed to the D-input of the flip-flop DF2 in synchronized relationship with the rising of the pulse of the abovementioned NAND gate ND3, and it is successively shifted.

Assuming that the received signal includes pulses having a predetermined period, as shown in FIG. 4(a), a received signal PL1 is firstly stored in the flip-flop DF2, which produces a "1" output. Then the signal PL1 is shifted to the flip-flop DF3, which produces a "1" output signal. A signal PL2 is stored in the flip-flop DF2, which produces a "1" output. The above shifting is repeated thereafter.

Now it is assumed that the transmitter is so constructed that it successively transmit two pulses as one cycle after transmitting a first pulse. In such construction, when the receiver received a pulse from the transmitter, a pulse PL3 is generated and when it is stored in the flip-flop DF2, the pulse PL1 is shifted to the flip-flop DF4. In such state, the outputs of both flip-flops DF2 and DF4 are consistent with each other, so that the Exclusive OR gate produces a "0" output. If the pulse PL1 and the pulse PL3 are inconsistent with each other, the Exclusive OR gate EXR0 produces a "1" output. When the received signal PL4 is stored by the flip-flop DF2, the received signal PL2 has been shifted to the flip-flop DF4. Accordingly, if the received signals PL2 and PL4 are consistent with each other, the Exclusive OR gate EXR0 produces a "0" output, while if these signals are inconsistent with each other the Exclusive OR gate produces a "1" output. That is, the Exclusive OR gate EXR0 acts to decide whether two cycles of the signal transmitted by the transmitter, which is arranged to transmit two pulses as one cycle, are consistent with each other or not, and if they are inconsistent with each other, said Exclusive OR gate produces a "1" output, which is fed to the NAND gate ND1. One of the other inputs of said NAND gate ND1 is an OR signal (FIG. 4g) based on an AND signal produced by the AND gate AD7 on the basis of the output of the flip-flop DF9 (FIG. 4c), the output of the flip-flop DF10 (FIG. 4d) and an output signal of the flip-flop DF11 (FIG. 4e). The other input of said NAND gate ND1 is the output of the AND gate AD1. Under the circumstances, when the inconsistency as described above is detected, the output of the NAND gate ND1 is "0", the output of the NAND gate ND0 is "1", the $\overline{Q}$ output of the flip-flop JF0 is "1", and the state shifts from CC1 to CC0 again. Accordingly, the receiver only repeats shifting between CC0 state and CC1 state until it receives a normal signal from the transmitter. Thus, the malfunction of the receiver, which may be caused by an external light incident upon the light receiving diode D0, is avoided.

Now it is assumed that two pulses of a normal signal is transmitted from the transmitter. Under such circumstance, at the time when the received signal PL4 is fed into the flip-flop DF2, the $\overline{Q}$ outputs of the flip-flops DF2 and DF3 are in "1" states, and these outputs are fed into the AND gate AD5. At this stage, the Q output of the D type flip-flop DF11 is in "1" state, as indicated in FIG. 4(e), and it is fed to the AND gate AD5. Accordingly, the AND gate AD2 produces a "1" output, which is fed to the J-terminal of the JK type flip-flop JK1, which is set thereby. Thus, the Q outputs of both JK type flip-flops JF0 and JF1 become "1", and the AND gate AD2 produces a "1" signal, while the AND gates AD0, AD1 and AD3 produce "0" signals. In the flowchart shown in FIG. 2, this state is indicated by CC2.

Therefore, only when the light signal having same pulse form as that of the received signal shown in FIG. 4(a) is transmitted by the transmitter (not shown) in the form of a light signal including two pulse as one cycle, the detecting mode CC1 shifts to the operating mode CC2. In the other cases, the state shifts to the waiting mode CC0. The flip-flops DF5-DF20 are reset if the state shifts from CC0 to CC1, and at this stage they start counting operation again.

Now the operation after CC2 will be explained. The Q output of the D type flip-flop DF20 is fed to one of the inputs of the NAND gate ND2 and the output of the AND gate AD2 is fed to the other input of the NAND gate ND2. Accordingly, the counting operation of the counter proceeds after shifting to said CC2 state and the CC2 state is held until the Q output of the D type flip-flop DF20 becomes "1". Owing to the Q output of the flip-flop DF2 becoming "1", the NAND gate ND2 produces a "0" output, which is fed through the NAND gate ND0 to the K-terminal of the JK type flip-flop JK0, which is reset thereby. Accordingly, the Q outputs of the JK type flip-flops JF0 and JF1 become "0" state and "1" state, respectively, so that the AND gate AD3 produces a "1" output, while the other NAND gates AD0-AD2 produce "0" outputs. This state is indicated by CC3 in the flowchart. Thus the state shifts to the release mode CC3 a predetermined time after shifting to the CC2 state.

At the time of shifting to CC3, the $\bar{Q}$ output of the flip-flop DF1 becomes a "1" state by the action of the signal fed from the gate ND0 and the flip-flops DF5–DF20 are reset. From this state, the counter, constituted by the flip-flops DF5–DF20, starts the counting operation. After shifting to CC3, the counting operation of said counter proceeds, and this CC3 state is held until the Q output of the D type flip-flop DF11 becomes "1". When the Q output of the D type flip-flop DF11 becomes "1" and said "1" signal is fed to one of the inputs of the AND gate AD6, the AND gate AD5 produces a "1" output, which is fed to the K-terminal of the JK type flip-flop JK1, which is reset thereby. Accordingly, the Q outputs of both flip-flops JF0 and JF1 become "0", so that the AND gate AD0 produces a "1" output, while the other AND gates AD1–Ad3 produce "0" outputs. Thus, the state returns to CC0. The abovementioned outputs of the AND gates AD2 and AD3 are fed to the OR gate OR0. The output of the OR gate OR0 is fed to a transistor T0, which forms, through a connector CN, a signal equivalent to a switching-ON signal for a first stroke switch SW1. On the other hand, the output of the AND gate AD3 is fed to a transistor T1, which is connected in parallel with a second-stroke switch SW2 of the camera, and the transistor T1 forms, through the connector CN, a signal equivalent to a switching-ON signal for the second-stroke switch SW2.

Thus, the receiver starts its operation when it receives the light signal transmitted by the transmitter and the state shift to CC2, as explained above. Accordingly, the first stroke operation of the camera is effected under remote control manner, and, at a predetermined time after the first stroke operation, the state shifts to CC3, that is, the release operation is started. In other words, the self-timer operation is effected under remote control manner.

It will be understood from the above description that the present invention provides a camera remote control system in which a predetermined delay time is provided between the operation of the first stroke switch for controlling the starting of the preparatory sequence, such as exposure, light-measuring operations of the camera and the operation of the second stroke switch for controlling the actual releasing operation of the camera, so that a camera which can operate in many kinds of modes and which is considerably valuable in practical use is obtained.

What is claimed is:

1. A receiver of a camera remote control system including a transmitter arranged at a remote position to transmit a control signal and a receiver arranged at a camera to receive said control signal to control the operation of the camera, said control signal being in the form of a plurality of cycles of pulses, each cycle including the pulses repeating at a predetermined recurrence rate and a predetermined period, comprising:
   (a) first signal forming means arranged to form a first signal when it received the control signal from the transmitter;
   (b) a timer circuit arranged to generate an output signal when a predetermined time has lapsed after forming said first signal; and
   (c) means connected to the camera and arranged to feed said first signal to the camera as a first operating signal for effecting a preparatory operation of the camera and to feed the output signal of the timer circuit to the camera as a release signal for effecting a releasing operation of the camera; and
   (d) a decision circuit for determining if the received pulses in the respective cycles are in consistent state, wherein said first signal forming means is arranged to form said first signal when it is decided by said decision circuit that the received pulses in the respective cycles are in consistent state.

2. A receiver of a camera remote control system including a transmitter arranged at a remote position to transmit a control signal and a receiver arranged at a camera to receive said control signal to control the operation of the camera, comprising:
   (a) first signal forming means arranged to form a first signal when it received the control signal from the transmitter;
   (b) a timer circuit arranged to generate an output signal when a predetermined time has lapsed after forming said first signal; and
   (c) means connected to the camera and arranged to feed said first signal to the camera as a first operating signal for effecting a preparatory operation of the camera and to feed the output signal of the timer circuit to the camera as a release signal for effecting a releasing operation of the camera, wherein said means connected to the camera includes first switching means arranged to effect its switching operation in response to said first signal, second switching means arranged to effect its switching operation in response to the output of said timer circuit, and a connecting member arranged to connect said first switching means in parallel with a first operating switch arranged to operate in associated with a first stroke of operation of a release operating member of the camera and to connect said second switching means in parallel with a second operating switch arranged to operate in association with a second stroke of operation of said release operating member.

3. A receiver of a camera remote control system, including a transmitter arranged at a remote position to transmit a control signal and a receiver arranged at a camera to receiver said control signal to control the operation of the camera, comprising:
   (a) a signal receiving part for receiving the control signal transmitted by said transmitter;
   (b) a logic circuit arranaged to shift from a first output state to a second output state in response to a signal received by said signal receiving part when said logic circuit is in the first output state;
   (c) a timer circuit arranged to operate in response to the second output state to generate an output signal after counting a predetermined time in response to the second output state, said logic circuit being arranged to shift to a third output state in response to the output signal of said timer circuit when said logic circuit is in the second output state, said timer circuit being arranged to count a predetermined time in response to said third output state to generate an output signal after counting said predetermined time, said logic circuit returning to said first output state in response to the output signal of said timer circuit when said logic circuit is in the third output state; and
   (d) means connected to the camera and arranged to transmit the second output state to the camera as a first operating signal for effecting a preparatory operation of the camera, and to transmit the third output state to the camera as a release signal for effecting a release operation of the camera.

4. A receiver according to claim 1, wherein said means connected to the camera includes first switching means arranged to effect its switching operation in response to said first signal, second switching means arranged to effect its switching operation in response to the output of said timer circuit, and a connecting member arranged to connect said first switching means in parallel with a first operating switch arranged to operate in association with a first stroke of operation of a release operating member of the camera and to connect said second switching means in parallel with a second operating switch arranged to operate in aassociation with a second stroke of operation of said release operating member.

5. A receiver according to claim 1, wherein said receiver further comprises a light receiving element.

6. A receiver according to claim 5, wherein said light receiving element is a light receiving diode.

* * * * *